United States Patent
Fang et al.

(10) Patent No.: US 11,958,930 B2
(45) Date of Patent: Apr. 16, 2024

(54) CATALYTIC HYDROGENATION METHOD FOR CARBON NINE RESIN

(71) Applicant: NINGBO UNIVERSITY OF TECHNOLOGY, Zhejiang (CN)

(72) Inventors: Jianghua Fang, Zhejiang (CN); Hui Huang, Zhejiang (CN); Weihong Xu, Zhejiang (CN); Ying Li, Zhejiang (CN); Haojian Zhang, Zhejiang (CN); Xunwen Xiao, Zhejiang (CN); Bin Wang, Zhejiang (CN); Minjie Hu, Zhejiang (CN)

(73) Assignee: NINGBO UNIVERSITY OF TECHNOLOGY, Zhejiang (CN)

(*) Notice: Subject to any disclaimer, the term of this patent is extended or adjusted under 35 U.S.C. 154(b) by 476 days.

(21) Appl. No.: 17/312,017

(22) PCT Filed: Apr. 24, 2020

(86) PCT No.: PCT/CN2020/086584
§ 371 (c)(1),
(2) Date: Jun. 9, 2021

(87) PCT Pub. No.: WO2021/169015
PCT Pub. Date: Sep. 2, 2021

(65) Prior Publication Data
US 2022/0325010 A1 Oct. 13, 2022

(30) Foreign Application Priority Data
Feb. 28, 2020 (CN) .......................... 202010128069.8

(51) Int. Cl.
*C08F 8/04* (2006.01)
*B01J 21/00* (2006.01)
(Continued)

(52) U.S. Cl.
CPC ............... *C08F 8/04* (2013.01); *B01J 21/005* (2013.01); *B01J 21/04* (2013.01); *B01J 23/63* (2013.01);
(Continued)

(58) Field of Classification Search
CPC .. C08F 8/04; B01J 21/005; B01J 21/04; B01J 23/63; B01J 37/0203; B01J 37/06; B01J 37/08
See application file for complete search history.

(56) References Cited

U.S. PATENT DOCUMENTS 3,966,833 A 6/1976 Cosyns et al.

FOREIGN PATENT DOCUMENTS

| CN | 102002130 | | 4/2011 | |
|---|---|---|---|---|
| CN | 102002130 A | * | 4/2011 | ............ C08F 240/00 |

(Continued)

OTHER PUBLICATIONS

CN105859965A_English (Year: 2016).*
CN-102002130-A_English (Year: 2011).*
CN104877077A_English (Year: 2015).*
CN-107880159-A_English (Year: 2018).*
(Continued)

*Primary Examiner* — Youngsul Jeong
(74) *Attorney, Agent, or Firm* — JCIP GLOBAL INC.

(57) ABSTRACT

The present invention discloses a catalytic hydrogenation method for carbon nine resin, comprising the following steps: 1) adding a Pt—W—Y/γ-Al$_2$O$_3$ catalyst in the first half of a fixed bed, adding a Pd—Zr—Nd/γ-Al$_2$O$_3$ catalyst in the second half of the fixed bed, and feeding hydrogen for reduction; and 2) catalytic hydrogenating the pretreated carbon nine resin in the fixed bed. In the present invention, different catalysts capable of reacting under the same catalytic conditions are added in the first and second halves of the fixed bed, and the two different catalysts play different roles, and can be active and complementary to each other under the same conditions. The synergistic effect of the two (Continued)

catalysts plays a good catalytic role. Moreover, the production process is simplified, and the production cost is saved.

5 Claims, 5 Drawing Sheets

(51) Int. Cl.
  *B01J 21/04* (2006.01)
  *B01J 23/63* (2006.01)
  *B01J 37/02* (2006.01)
  *B01J 37/06* (2006.01)
  *B01J 37/08* (2006.01)

(52) U.S. Cl.
  CPC ........... *B01J 37/0203* (2013.01); *B01J 37/06* (2013.01); *B01J 37/08* (2013.01); *B01J 2523/3725* (2013.01); *B01J 2523/48* (2013.01); *B01J 2523/824* (2013.01)

(56) References Cited

FOREIGN PATENT DOCUMENTS

| | | | | |
|---|---|---|---|---|
| CN | 102924659 | | 2/2013 | |
| CN | 104877077 | | 9/2015 | |
| CN | 104877077 A | * | 9/2015 | ............ C08F 240/00 |
| CN | 105175633 | | 12/2015 | |
| CN | 105859965 | | 8/2016 | |
| CN | 105859965 A | * | 8/2016 | ................ C08F 4/24 |
| CN | 106832127 | | 6/2017 | |
| CN | 106832127 A | * | 6/2017 | ............ C08F 240/00 |
| CN | 107880159 | | 4/2018 | |
| CN | 107880159 A | * | 4/2018 | ............ C08F 240/00 |
| WO | 2007099038 | | 9/2007 | |

OTHER PUBLICATIONS

CN106832127A_English (Year: 2017).*
"International Search Report (Form PCT/ISA/210) of PCT/CN2020/086584," dated Nov. 30, 2020, pp. 1-5.

* cited by examiner

CATALYTIC HYDROGENATION METHOD FOR CARBON NINE RESIN

CROSS-REFERENCE TO RELATED APPLICATION

This application is a 371 of international application of PCT application serial no. PCT/CN2020/086584, filed on Apr. 24, 2020, which claims the priority benefit of China application no. 202010128069.8, filed on Feb. 28, 2020. The entirety of each of the above mentioned patent applications is hereby incorporated by reference herein and made a part of this specification.

TECHNICAL FIELD OF THE INVENTION

The present invention relates to the catalytic hydrogenation of petroleum resins, and in particular to a catalytic hydrogenation method for carbon nine resin.

BACKGROUND OF THE INVENTION

Carbon nine (C9) resin is a by-product obtained by producing ethylene by cracking. Hydrogenation catalysis of C9 resin saturates double bonds and some benzene in the resin and removes residual halogens during the polymerization of the resin, so that the chromaticity, photo-thermal stability, oxidation stability and ultraviolet resistance of the resin are improved, the quality of products is improved and the range of application of the resin is expanded. With the development in the application of adhesives and sealants, particularly in the applications of transparent pressure-sensitive adhesive tapes, sealants for outdoor use, disposable sanitary products, medical adhesive tapes, traffic paint and polyolefin modifiers, petroleum resins with light color, no odor and good stability are required, and C9 resin is one of such petroleum resins. Accordingly, the demand for hydrogenated C9 resin is fast increasing, and the development of hydrogenation catalysis for C9 resin is thus promoted. The selection of catalysts is the key to affect the quality of finished products of the hydrogenation of C9 resin.

As the C9 resin has complex raw materials (there are often many impurities such as chromogenic groups, gel, S and Cl), resin hydrogenation catalysts are mainly classified into noble metal catalysts and non-noble metal catalysts. The noble metal catalysts mainly include palladium catalysts and palladium-platinum catalysts. These catalysts have the advantages of high activity, low starting temperature, and high yield and good quality of products. However, disadvantageously, they are sensitive to poisons such as sulfur and easy to be poisoned and deactivated. The non-noble metal catalysts are mostly nickel catalysts supported on diatomite or alumina-diatomite, nickel-tungsten catalysts or nickel sulfide-molybdenum catalysts. Such catalysts are relatively high in sulfur resistance. However, the catalysts are low in activity, the bromine number of the product is still high, serious degradation occurs after the hydrogenation, the product resin has a yield of only about 80%, the softening point is decreased from 120° C. to 90° C., and the catalysts have short service life. Therefore, in the prior art, C9 resin is hydrogenated and catalyzed in stages by using different catalysts. Chinese Patent CN102924659A has disclosed a method for hydrogenating resin by a two-stage fixed bed. The catalyst in the first stage is $Ni/Al_2O_3$, which is mainly used to remove sulfur in the raw resin. In the second stage, the noble metal $Pt—Pd/Al_2O_3$, as the hydrogenation catalyst, is manly used for hydrogenation and decolorization. During the hydrodesulfurization in the first stage, the pressure for hydrogenation is 2.0 to 6.0 MPa, the reaction temperature is 250° C. to 350° C., and the liquid space velocity is 1 to 5 $h^{-1}$. During the hydrogenation and decolorization in the second stage, the pressure for hydrogenation is 6.0 to 12.0 MPa, the reaction temperature is 250° C. to 350° C., the liquid space velocity is 1 to 5 $h^{-1}$. The hydrogenation is catalyzed at a high pressure in a fixed bed. The method gives full play to the advantages of the two-stage catalysts and prolongs the service life of the noble metal catalysts. However, this method has the following disadvantages: the catalytic effect is still not ideal, and the method cannot be completed in the same fixed bed as the two-stage catalysts require different pressurization conditions; the production efficiency is low; and, there is pressure interference during the actual operation process, thereby affecting the final quality of the C9 resin.

In conclusion, at present, the hydrogenation catalysts for C9 resin have poor catalytic effect, complex hydrogenation catalysis process and other problems. Therefore, it is necessary to develop a catalytic hydrogenation method for C9 resin with high catalytic efficiency and simple process.

SUMMARY OF THE INVENTION

It is an object of the present invention to provide a catalytic hydrogenation method by which C9 resin with good chromaticity, low bromine number and simple process can be prepared.

For achieving the above object, the catalytic hydrogenation method for C9 resin is characterized in comprising the following steps: 1) adding a $Pt—W—Y/\gamma-Al_2O_3$ catalyst in the first half of a fixed bed, adding a $Pd—Zr—Nd/\gamma-Al_2O_3$ catalyst in the second half of the fixed bed, and feeding hydrogen for reduction; and 2) catalytic hydrogenating the pretreated C9 resin in the fixed bed.

Preferably, the $Pt—W—Y/\gamma-Al_2O_3$ catalyst is prepared by dipping: dipping a $\gamma-Al_2O_3$ carrier into an aqueous solution of platinum nitrate, tungsten nitrate and yttrium nitrate, where the mole ratio of Pt to W is 1:0.1 to 1:0.5, and the mole ratio of Pt to Y is 1:0.05 to 1:0.1; airing at the room temperature, drying for 5 to 10 hours in a vacuum drying oven at 100° C. to 150° C., roasting for 4 to 8 hours in a muffle furnace at 400° C. to 700° C., and then cooling to the room temperature, and washing with deionized water until the pH is neutral, and drying at 100° C. to 150° C.; and the $Pd—Zr—Nd/\gamma-Al_2O_3$ catalyst is prepared by dipping: dipping a $\gamma-Al_2O_3$ carrier into an aqueous solution of palladium nitrate, zirconium nitrate and neodymium nitrate, where the mole ratio of Pd to Zr is 1:01 to 1:0.5, and the mole ratio of Pd to Nd is 1:0.05 to 1:0.1, airing at the room temperature, drying for 5 to 10 hours in a vacuum drying oven at 100° C. to 150° C., roasting for 4 to 8 hours in a muffle furnace at 400° C. to 700° C., and then cooling to the room temperature, and washing with deionized water until the pH is neutral, and drying at 100° C. to 150° C.

Preferably, the hydrogen reduction conditions for the $Pt—W—Y/\gamma-Al_2O_3$ and $Pd—Zr—Nd/\gamma-Al_2O_3$ catalysts are as follows: high-purity hydrogen is fed for reduction, the reduction temperature is 200° C. to 400° C., and the reduction time is 2 to 5 hours.

Preferably, the catalytic hydrogenation conditions are as follows: the reaction temperature is 200° C. to 320° C., the reaction pressure is 10 to 25 MPa, the volumetric space velocity is 0.1 to 1.0 $h^{-1}$, and the volume ratio of hydrogen to C9 resin is 400:1 to 900:1.

Preferably, the C9 resin is pretreated under the following conditions: dissolving the C9 resin with cyclohexane or ethylcyclohexane at a solubility of 5 wt % to 20 wt %, and passing the solution through a carclazyte or diatomite filtration column.

Compared with the prior art, the present invention has the following advantages. Firstly, different catalysts capable of reacting under the same catalytic conditions are added in the first and second halves of the fixed bed. The Pt—W—Y/$\gamma$-Al$_2$O$_3$ catalyst is mainly used for sulfur removal, halogen removal and double-bond hydrogenation in the C9 resin, and it is difficult to be poisoned due to the presence of W. The Pd—Zr—Nd/$\gamma$-Al$_2$O$_3$ catalyst is mainly used for deep hydrogenation and further removal of other heteroatoms, can remove residual sulfur and nitrogen in the C9 resin, and plays a detoxification role due to the presence of a small amount of Zr, so that poisoning will not be caused while the Pt—W—Y/$\gamma$-Al$_2$O$_3$ has high activity. The two different catalysts play different roles, and can be active and complementary to each other under the same conditions. The synergistic effect of the two catalysts plays a good catalytic role. Moreover, the production process is simplified, and the production cost is saved.

Secondly, the synergistic effect of Pt—W—Y/$\gamma$-Al$_2$O$_3$ and Pd—Zr—Nd/$\gamma$-Al$_2$O$_3$ can decrease the bromine number in the C9 resin from 32.5 gBr/100 g to below 4.0 gBr/100 g and control the Gardner chromaticity to be below 3.0. It indicates that the catalysts are effective for the catalytic hydrogenation of C9 resin.

DETAILED DESCRIPTION OF THE EMBODIMENTS

The specific implementations of the present invention will be further described in detail by embodiments with reference to the accompanying drawings.

Embodiment 1

The catalytic hydrogenation method for C9 resin comprised the following steps. 1) A Pt—W—Y/$\gamma$-Al$_2$O$_3$ catalyst was added in the first half of a fixed bed, a Pd—Zr—Nd/$\gamma$-Al$_2$O$_3$ catalyst was added in the second half of the fixed bed, hydrogen having a high purity of 99.999% was fed into the fixed bed for reduction, and the reduction was performed at 400° C. for 2 hours.

The Pt—W—Y/$\gamma$-Al$_2$O$_3$ catalyst was prepared by dipping: dipping a $\gamma$-Al$_2$O$_3$ carrier into an aqueous solution of platinum nitrate, tungsten nitrate and yttrium nitrate, where the mole ratio of Pt to W was 1:0.1, and the mole ratio of Pt to Y was 1:0.1; airing at the room temperature, drying for 5 hours in a vacuum drying oven at 150° C., roasting for 4 hours in a muffle furnace at 700° C., and then cooling to the room temperature; and, washing with deionized water until the pH was neutral, and drying at 150° C.

The Pd—Zr—Nd/$\gamma$-Al$_2$O$_3$ catalyst was prepared by dipping: dipping a $\gamma$-Al$_2$O$_3$ carrier into an aqueous solution of palladium nitrate, zirconium nitrate and neodymium nitrate, where the mole ratio of Pd to Zr was 1:0.1, and the mole ratio of Pd to Nd was 1:0.1; airing at the room temperature, drying for 5 hours in a vacuum drying oven at 150° C., roasting for 8 hours in a muffle furnace at 400° C., and then cooling to the room temperature; and, washing with deionized water until the pH was neutral, and drying at 150° C.

2) The Pretreated C9 Resin was Catalytic Hydrogenated in the Fixed Bed.

The C9 resin was dissolved with cyclohexane at a solubility of 5 wt %, and the solution was passed through a carclazyte filtration column. Insoluble gel, asphaltene and a small amount of free heavy metal were adsorbed onto the carclazyte, and the pretreated C9 resin solution was catalytic hydrogenated.

The catalytic hydrogenation conditions were as follows: the reaction temperature was 320° C., the reaction pressure was 25 MPa, the volumetric space velocity was 0.1 h$^{-1}$, and the volume ratio of hydrogen to C9 resin was 400:1.

Figure 1:
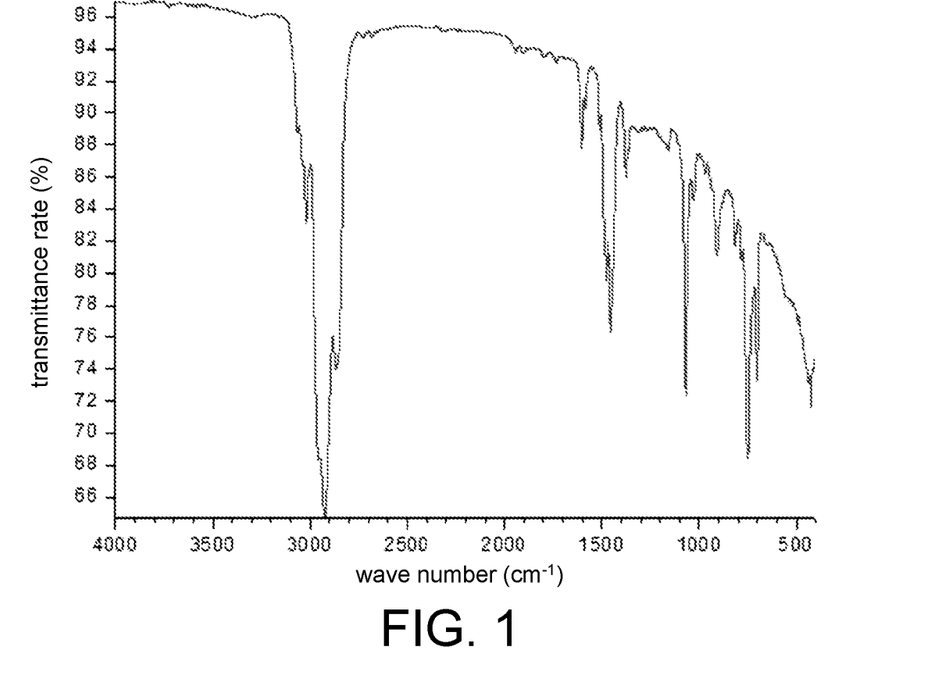
FIG. 1 is an infrared spectrum of a C9 resin before catalytic hydrogenation according to Embodiment 1 of the present invention.
Figure 2:
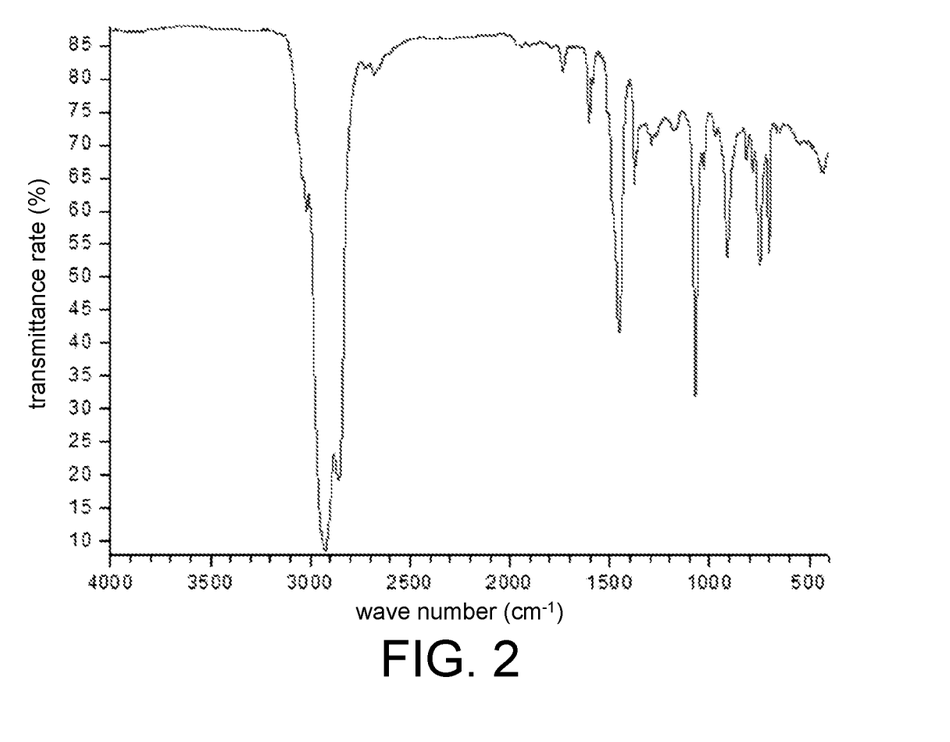
FIG. 2 is an infrared spectrum of the C9 resin after catalytic hydrogenation according to Embodiment 1 of the present invention.

As shown in FIG. 2, the carbon-hydrogen absorption peak on the 3019 cm$^{-1}$ carbon-carbon double bond was obviously less than that on the 3019 cm$^{-1}$ carbon-carbon double bond in FIG. 1, the bromine number of the C9 resin was decreased from 32.5 gBr/100 g to 3.2 gBr/100 g, and the Gardner chromaticity was 2.8. It indicated that the catalysts were effective for the catalytic hydrogenation of the C9 resin.

Embodiment 2

The catalytic hydrogenation method for C9 resin comprised the following steps. 1) A Pt—W—Y/$\gamma$-Al$_2$O$_3$ catalyst was added in the first half of a fixed bed, a Pd—Zr—Nd/$\gamma$-Al$_2$O$_3$ catalyst was added in the second half of the fixed bed, hydrogen having a high purity of 99.999% was fed into the fixed bed for reduction, and the reduction was performed at 200° C. for 5 hours.

The Pt—W—Y/$\gamma$-Al$_2$O$_3$ catalyst was prepared by dipping: dipping a $\gamma$-Al$_2$O$_3$ carrier into an aqueous solution of platinum nitrate, tungsten nitrate and yttrium nitrate, where the mole ratio of Pt to W was 1:0.5, and the mole ratio of Pt to Y was 1:0.05; airing at the room temperature, drying for 10 hours in a vacuum drying oven at 100° C., roasting for 8 hours in a muffle furnace at 400° C., and then cooling to the room temperature; and, washing with deionized water until the pH was neutral, and drying at 100° C.

The Pd—Zr—Nd/γ-Al$_2$O$_3$ catalyst was prepared by dipping: dipping a γ-Al$_2$O$_3$ carrier into an aqueous solution of palladium nitrate, zirconium nitrate and neodymium nitrate, where the mole ratio of Pd to Zr was 1:0.5, and the mole ratio of Pd to Nd was 1:0.05; airing at the room temperature, drying for 10 hours in a vacuum drying oven at 100° C., roasting for 8 hours in a muffle furnace at 700° C., and then cooling to the room temperature; and, washing with deionized water until the pH was neutral, and drying at 100° C.

2) The Pretreated C9 Resin was Catalytic Hydrogenated in the Fixed Bed.

The C9 resin was dissolved with cyclohexane at a solubility of 20 wt %, and the solution was passed through a diatomite filtration column. Insoluble gel, asphaltene and a small amount of free heavy metal were adsorbed onto the diatomite, and the pretreated C9 resin solution was catalytic hydrogenated.

The catalytic hydrogenation conditions were as follows: the reaction temperature was 200° C., the reaction pressure was 10 MPa, the volumetric space velocity was 1.0 h$^{-1}$, and the volume ratio of hydrogen to C9 resin was 900:1.

Figure 3:
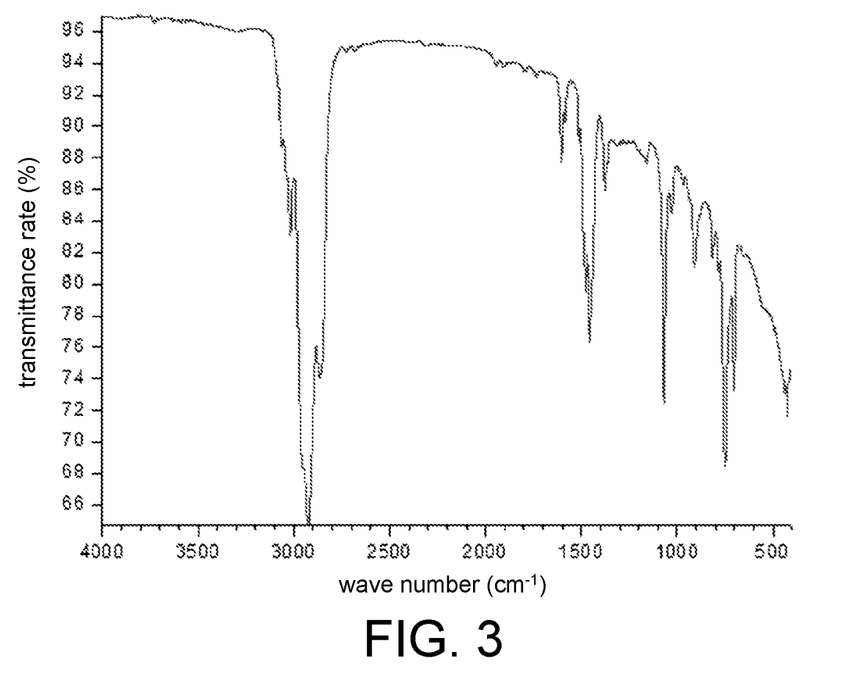
FIG. 3 is an infrared spectrum of the C9 resin before catalytic hydrogenation according to Embodiment 2 of the present invention.
Figure 4:
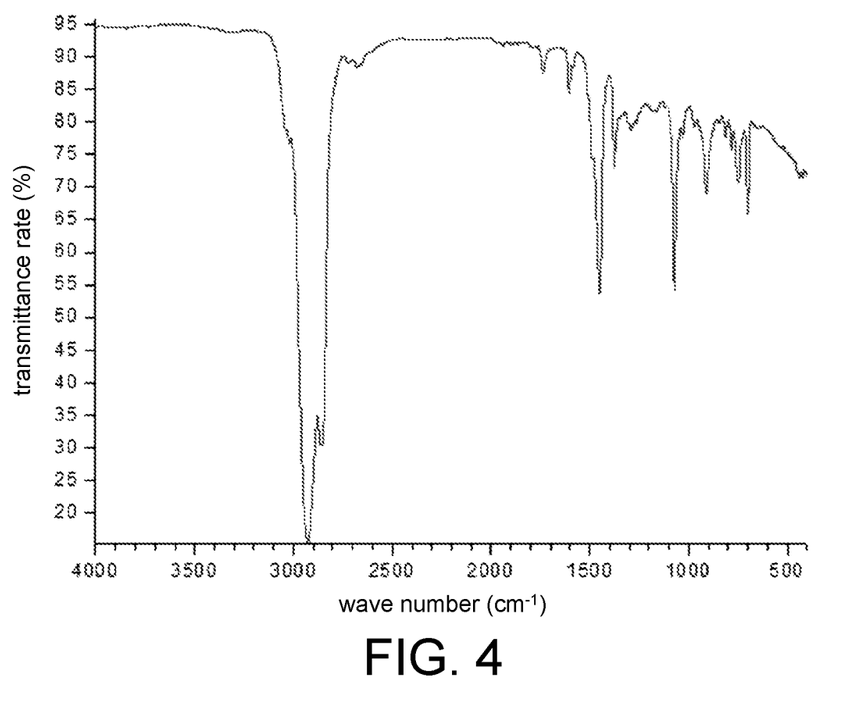
FIG. 4 is an infrared spectrum of the C9 resin after catalytic hydrogenation according to Embodiment 2 of the present invention.

As shown in FIG. 4, the carbon-hydrogen absorption peak on the 3019 cm$^{-1}$ carbon-carbon double bond was obviously less than that on the 3019 cm$^{-1}$ carbon-carbon double bond in FIG. 3, the bromine number of the C9 resin was decreased from 32.5 gBr/100 g to 1.8 gBr/100 g, and the Gardner chromaticity was 1.9. It indicated that the catalysts were effective for the catalytic hydrogenation of the C9 resin.

Embodiment 3

The catalytic hydrogenation method for C9 resin comprised the following steps. 1) A Pt—W—Y/γ-Al$_2$O$_3$ catalyst was added in the first half of a fixed bed, a Pd—Zr—Nd/γ-Al$_2$O$_3$ catalyst was added in the second half of the fixed bed, hydrogen having a high purity of 99.999% was fed into the fixed bed for reduction, and the reduction was performed at 300° C. for 3 hours.

The Pt—W—Y/γ-Al$_2$O$_3$ catalyst was prepared by dipping: dipping a γ-Al$_2$O$_3$ carrier into an aqueous solution of platinum nitrate, tungsten nitrate and yttrium nitrate, where the mole ratio of Pt to W was 1:0.3, and the mole ratio of Pt to Y was 1:0.07; airing at the room temperature, drying for 7 hours in a vacuum drying oven at 130° C., roasting for 7 hours in a muffle furnace at 600° C., and then cooling to the room temperature; and, washing with deionized water until the pH was neutral, and drying at 120° C.

The Pd—Zr—Nd/γ-Al$_2$O$_3$ catalyst was prepared by dipping: dipping a γ-Al$_2$O$_3$ carrier into an aqueous solution of palladium nitrate, zirconium nitrate and neodymium nitrate, where the mole ratio of Pd to Zr was 1:0.2, and the mole ratio of Pd to Nd was 1:0.08; airing at the room temperature, drying for 6 hours in a vacuum drying oven at 140° C., roasting for 6 hours in a muffle furnace at 500° C., and then cooling to the room temperature; and, washing with deionized water until the pH was neutral, and drying at 130° C.

2) The Pretreated C9 Resin was Catalytic Hydrogenated in the Fixed Bed.

The C9 resin was dissolved with ethylcyclohexane at a solubility of 20 wt %, and the solution was passed through a diatomite filtration column. Insoluble gel, asphaltene and a small amount of free heavy metal were adsorbed onto the diatomite, and the pretreated C9 resin solution was catalytic hydrogenated.

The catalytic hydrogenation conditions were as follows: the reaction temperature was 300° C., the reaction pressure was 20 MPa, the volumetric space velocity was 0.7 h$^{-1}$, and the volume ratio of hydrogen to C9 resin was 600:1.

Figure 5:
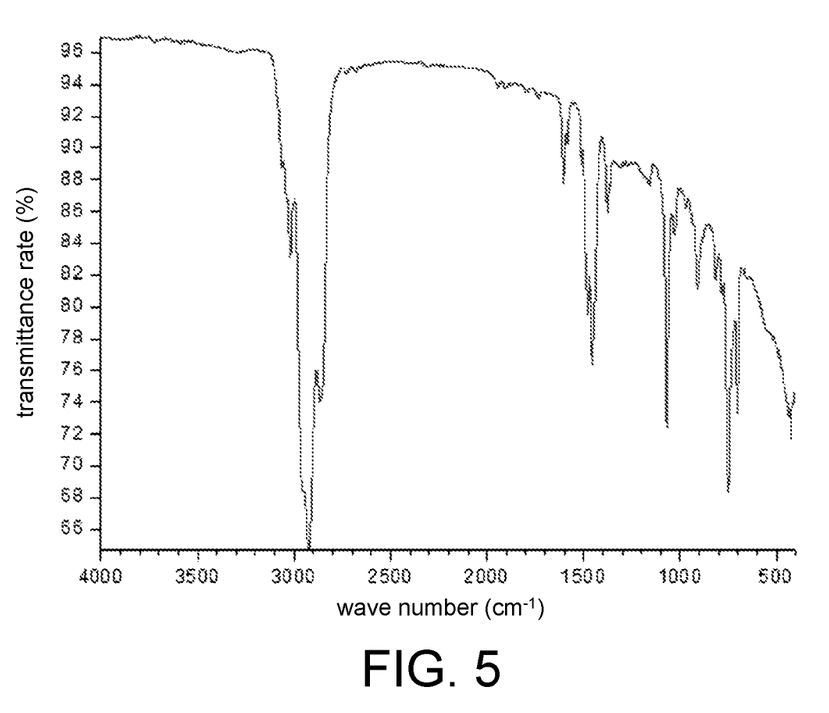
FIG. 5 is an infrared spectrum of the C9 resin before catalytic hydrogenation according to Embodiment 3 of the present invention.
Figure 6:
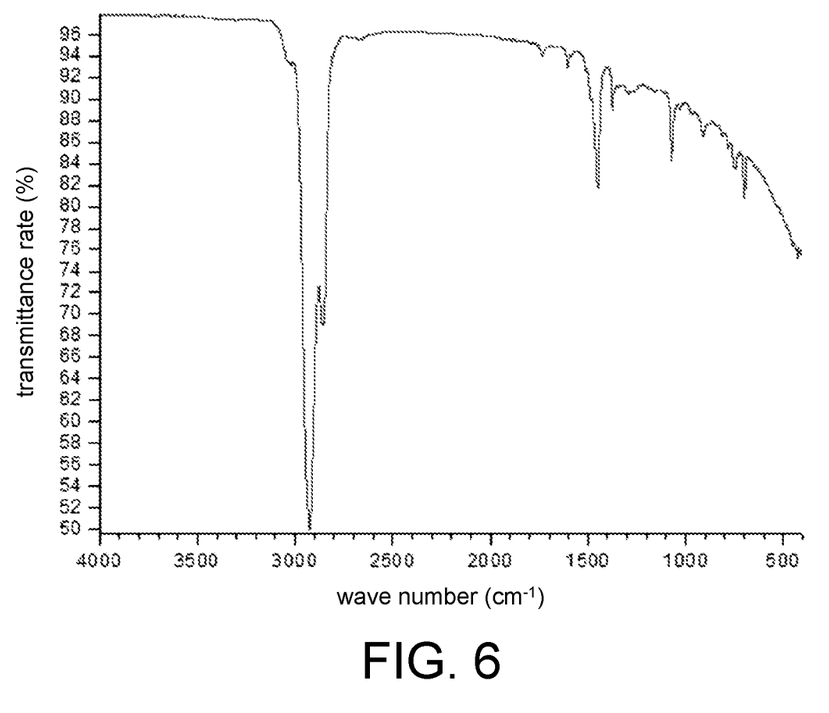
FIG. 6 is an infrared spectrum of the C9 resin after catalytic hydrogenation according to Embodiment 3 of the present invention.

As shown in FIG. 6, the carbon-hydrogen absorption peak on the 3019 cm$^{-1}$ carbon-carbon double bond was obviously less than that on the 3019 cm$^{-1}$ carbon-carbon double bond in FIG. 5, the bromine number of the C9 resin was decreased from 32.5 gBr/100 g to 0.9 gBr/100 g, and the Gardner chromaticity was 0.6. It indicated that the catalysts were effective for the catalytic hydrogenation of the C9 resin.

Embodiment 4

The catalytic hydrogenation method for C9 resin comprised the following steps. 1) A Pt—W—Y/γ-Al$_2$O$_3$ catalyst was added in the first half of a fixed bed, a Pd—Zr—Nd/γ-Al$_2$O$_3$ catalyst was added in the second half of the fixed bed, hydrogen having a high purity of 99.999% was fed into the fixed bed for reduction, and the reduction was performed at 350° C. for 3 hours.

The Pt—W—Y/γ-Al$_2$O$_3$ catalyst was prepared by dipping: dipping a γ-Al$_2$O$_3$ carrier into an aqueous solution of platinum nitrate, tungsten nitrate and yttrium nitrate, where the mole ratio of Pt to W was 1:0.4, and the mole ratio of Pt to Y was 1:0.06; airing at the room temperature, drying for 9 hours in a vacuum drying oven at 120° C., roasting for 5 hours in a muffle furnace at 500° C., and then cooling to the room temperature; and, washing with deionized water until the pH was neutral, and drying at 130° C.

The Pd—Zr—Nd/γ-Al$_2$O$_3$ catalyst was prepared by dipping: dipping a γ-Al$_2$O$_3$ carrier into an aqueous solution of palladium nitrate, zirconium nitrate and neodymium nitrate, where the mole ratio of Pd to Zr was 1:0.3, and the mole ratio of Pd to Nd was 1:0.07; airing at the room temperature, drying for 7 hours in a vacuum drying oven at 130° C., roasting for 7 hours in a muffle furnace at 600° C., and then cooling to the room temperature; and, washing with deionized water until the pH was neutral, and drying at 100° C.

2) The Pretreated C9 Resin was Catalytic Hydrogenated in the Fixed Bed.

The C9 resin was dissolved with ethylcyclohexane at a solubility of 10 wt %, and the solution was passed through a diatomite filtration column. Insoluble gel, asphaltene and a small amount of free heavy metal were adsorbed onto the diatomite, and the pretreated C9 resin solution was catalytic hydrogenated.

The catalytic hydrogenation conditions were as follows: the reaction temperature was 280° C., the reaction pressure was 18 MPa, the volumetric space velocity was 0.6 h$^{-1}$, and the volume ratio of hydrogen to C9 resin was 700:1.

Figure 7:
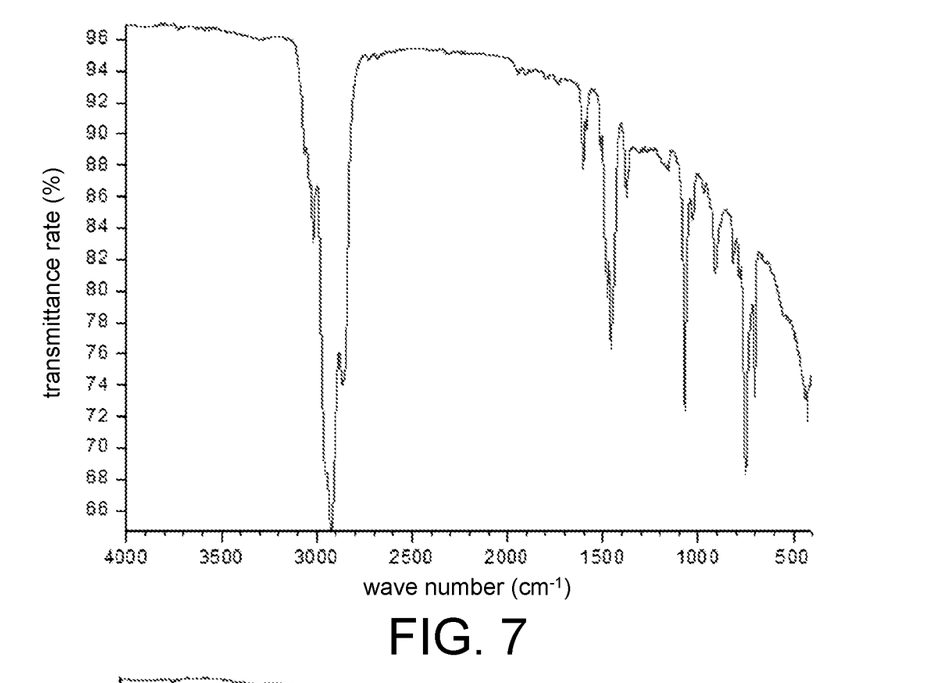
FIG. 7 is an infrared spectrum of the C9 resin before catalytic hydrogenation according to Embodiment 4 of the present invention.
Figure 8:
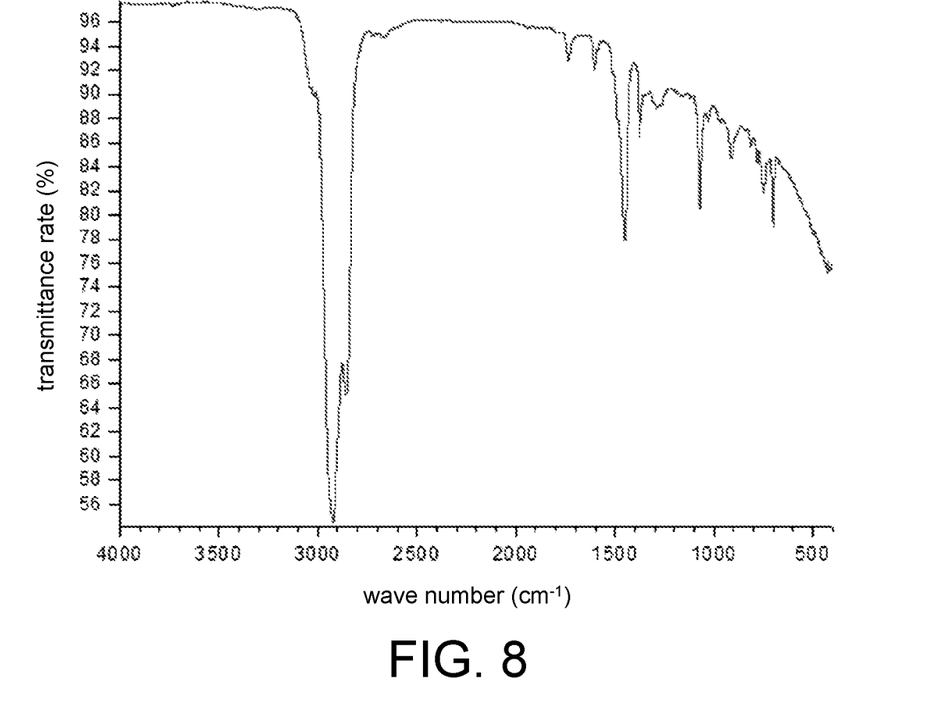
FIG. 8 is an infrared spectrum of the C9 resin after catalytic hydrogenation according to Embodiment 4 of the present invention.

As shown in FIG. 8, the carbon-hydrogen absorption peak on the 3019 cm$^{-1}$ carbon-carbon double bond was obviously less than that on the 3019 cm$^{-1}$ carbon-carbon double bond in FIG. 7, the bromine number of the C9 resin was decreased from 32.5 gBr/100 g to 1.1 gBr/100 g, and the Gardner chromaticity was 0.9. It indicated that the catalysts were effective for the catalytic hydrogenation of the C9 resin.

Embodiment 5

The catalytic hydrogenation method for C9 resin comprised the following steps. 1) A Pt—W—Y/γ-Al$_2$O$_3$ catalyst was added in the first half of a fixed bed, a Pd—Zr—Nd/

γ-Al$_2$O$_3$ catalyst was added in the second half of the fixed bed, hydrogen having a high purity of 99.999% was fed into the fixed bed for reduction, and the reduction was performed at 350° C. for 4 hours.

The Pt—W—Y/γ-Al$_2$O$_3$ catalyst was prepared by dipping: dipping a γ-Al$_2$O$_3$ carrier into an aqueous solution of platinum nitrate, tungsten nitrate and yttrium nitrate, where the mole ratio of Pt to W was 1:0.2, and the mole ratio of Pt to Y was 1:0.06; airing at the room temperature, drying for 6 hours in a vacuum drying oven at 110° C., roasting for 6 hours in a muffle furnace at 650° C., and then cooling to the room temperature; and, washing with deionized water until the pH was neutral, and drying at 110° C.

The Pd—Zr—Nd/γ-Al$_2$O$_3$ catalyst was prepared by dipping: dipping a γ-Al$_2$O$_3$ carrier into an aqueous solution of palladium nitrate, zirconium nitrate and neodymium nitrate, where the mole ratio of Pd to Zr was 1:0.2, and the mole ratio of Pd to Nd was 1:0.06; airing at the room temperature, drying for 9 hours in a vacuum drying oven at 100° C., roasting for 5 hours in a muffle furnace at 600° C., and then cooling to the room temperature; and, washing with deionized water until the pH was neutral, and drying at 110° C.

2) The Pretreated C9 Resin was Catalytic Hydrogenated in the Fixed Bed.

The C9 resin was dissolved with ethylcyclohexane at a solubility of 10 wt %, and the solution was passed through a diatomite filtration column. Insoluble gel, asphaltene and a small amount of free heavy metal were adsorbed onto the diatomite, and the pretreated C9 resin solution was catalytic hydrogenated.

The catalytic hydrogenation conditions were as follows: the reaction temperature was 250° C., the reaction pressure was 15 MPa, the volumetric space velocity was 0.5 h$^{-1}$, and the volume ratio of hydrogen to C9 resin was 800:1.

Figure 9:
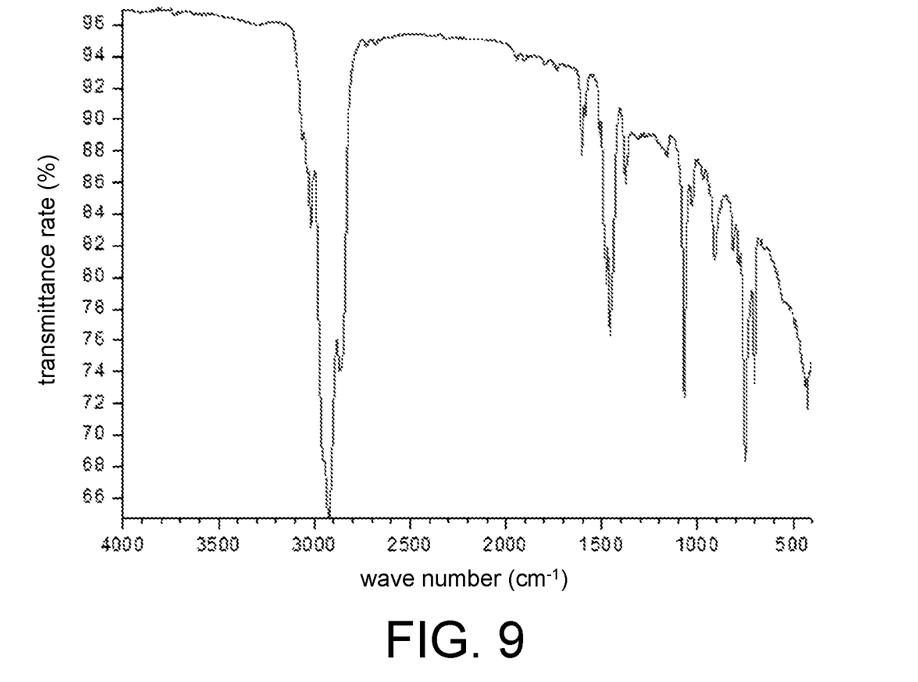
FIG. 9 is an infrared spectrum of the C9 resin before catalytic hydrogenation according to Embodiment 5 of the present invention.
Figure 10:
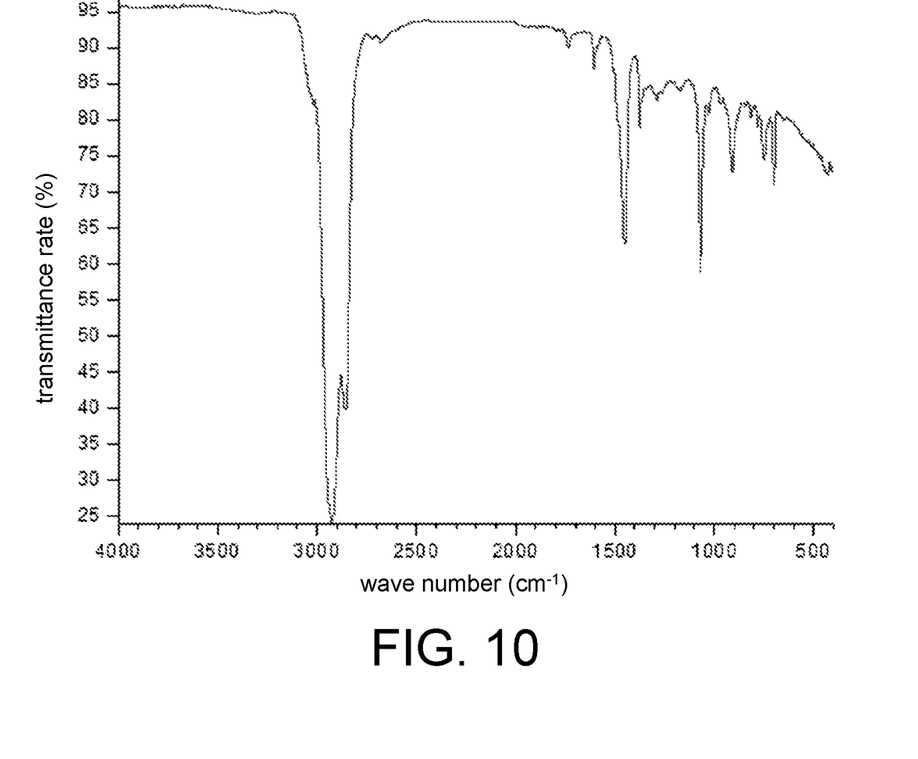
FIG. 10 is an infrared spectrum of the C9 resin after catalytic hydrogenation according to Embodiment 5 of the present invention.

As shown in FIG. 10, the carbon-hydrogen absorption peak on the 3019 cm$^{-1}$ carbon-carbon double bond was obviously less than that on the 3019 cm$^{-1}$ carbon-carbon double bond in FIG. 9, the bromine number of the C9 resin was decreased from 32.5 gBr/100 g to 1.5 gBr/100 g, and the Gardner chromaticity was 1.7. It indicated that the catalysts were effective for the catalytic hydrogenation of the C9 resin.

What is claimed is:

1. A catalytic hydrogenation method for carbon nine resin, wherein the method comprises the following steps:
   1) Preparing a carbon nine resin stream;
   2) Pretreating the carbon nine resin stream, thereby producing a pretreated carbon nine resin;
   3) Adding a Pt—W—Y/γ-Al$_2$O$_3$ catalyst in the first half of a fixed bed, adding a Pd—Zr—Nd/γ-Al$_2$O$_3$ catalyst in the second half of the fixed bed, and feeding hydrogen for reduction of the Pt—W—Y/γ-Al$_2$O$_3$ catalyst and the Pd—Zr—Nd/γ-Al$_2$O$_3$ catalysts; and
   4) catalytic hydrogenating under catalytic hydrogenation conditions the pretreated carbon nine resin in the fixed bed.

2. The catalytic hydrogenation method of claim 1, wherein the Pt—W—Y/γ-Al$_2$O$_3$ catalyst is prepared by dipping: dipping a γ-Al$_2$O$_3$ carrier into an aqueous solution of platinum nitrate, tungsten nitrate and yttrium nitrate, where a mole ratio of Pt to W is 1:0.1 to 1:0.5, and a ratio of Pt to Y is 1:0.05 to 1:0.1; airing at the room temperature, drying for 5 to 10 hours in a vacuum drying oven at 100° C. to 150° C., roasting for 4 to 8 hours in a muffle furnace at 400° C. to 700° C., and then cooling to the room temperature, and washing with deionized water until the pH is neutral, and drying at 100° C. to 150° C.; and the Pd—Zr—Nd/γ-Al$_2$O$_3$ catalyst is prepared by: dipping a γ-Al$_2$O$_3$ carrier into an aqueous solution of palladium nitrate, zirconium nitrate and neodymium nitrate, where a mole ratio of Pd to Zr is 1:01 to 1:0.5, and a mole ratio of Pd to Nd is 1:0.05 to 1:0.1, airing at the room temperature, drying for 5 to 10 hours in a vacuum drying oven at 100° C. to 150° C., roasting for 4 to 8 hours in a muffle furnace at 400° C. to 700° C., and then cooling to the room temperature, and washing with deionized water until the pH is neutral, and drying at 100° C. to 150° C.

3. The catalytic hydrogenation method of claim 1, wherein conditions for the reduction of having a purity of 99.999% is fed for reduction, a reduction temperature is 200° C. to 400° C., and a reduction time is 2 to 5 hours.

4. The catalytic hydrogenation method of claim 1, wherein the catalytic hydrogenation conditions are as follows: a reaction temperature is 200° C. to 320° C., a reaction pressure is 10 to 25 MPa, a volumetric space velocity is 0.1 to 1.0 h$^{-1}$ and a volume ratio of hydrogen to carbon nine resin is 400:1 to 900:1.

5. The catalytic hydrogenation method of claim 1, wherein the carbon nine resin is pretreated under the following conditions: dissolving the carbon nine resin with cyclohexane or ethylcyclohexane at a solubility of 5 wt % to 20 wt %, and passing the solution through a carclazyte or diatomite filtration column.

\* \* \* \* \*